(12) United States Patent
Orris et al.

(10) Patent No.: US 11,450,982 B2
(45) Date of Patent: Sep. 20, 2022

(54) 3D PRINTED ELECTRICAL CONNECTOR WITH TUNABLE DIELECTRIC CONSTANT

(71) Applicant: TE Connectivity Services GmbH, Schaffhausen (CH)

(72) Inventors: David Patrick Orris, Middletown, PA (US); Jessica H. B. Hemond, Mifflintown, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 252 days.

(21) Appl. No.: 16/944,686

(22) Filed: Jul. 31, 2020

(65) Prior Publication Data

US 2022/0037827 A1 Feb. 3, 2022

(51) Int. Cl.
| | |
|---|---|
| H01R 24/00 | (2011.01) |
| H01R 13/50 | (2006.01) |
| H01R 43/18 | (2006.01) |
| B33Y 80/00 | (2015.01) |
| H01R 13/646 | (2011.01) |
| B33Y 10/00 | (2015.01) |
| H01R 12/57 | (2011.01) |
| B29C 64/124 | (2017.01) |

(52) U.S. Cl.
CPC .............. *H01R 13/50* (2013.01); *B33Y 80/00* (2014.12); *H01R 13/646* (2013.01); *H01R 43/18* (2013.01); *B29C 64/124* (2017.08); *B33Y 10/00* (2014.12); *H01R 12/57* (2013.01)

(58) Field of Classification Search
CPC ........ H01R 12/51; H01R 12/55; H01R 12/57; H01R 43/18; H01R 13/50; H01R 13/646; B33Y 80/00; B33Y 10/00; B29C 64/124
USPC .......................................... 439/660
See application file for complete search history.

(56) References Cited

U.S. PATENT DOCUMENTS

| | | | | |
|---|---|---|---|---|
| 8,591,261 B2* | 11/2013 | Das | ..................... | H01R 13/7193 439/620.05 |
| 9,437,976 B2* | 9/2016 | Qi | ..................... | H01R 13/6477 |
| 9,466,932 B2* | 10/2016 | Hou | ..................... | H01R 24/66 |
| 2013/0034996 A1* | 2/2013 | Das | ..................... | H01R 13/7193 439/620.05 |
| 2022/0037827 A1* | 2/2022 | Orris | ..................... | H01R 24/60 |

* cited by examiner

*Primary Examiner* — Khiem M Nguyen

(57) ABSTRACT

An electrical connector assembly which has a housing formed of a first photocurable polymer composition. Signal contacts are positioned in the housing for transmitting signals at a determined signal speed. A dielectric constant of the photocurable polymer composition is tuned to have a higher or lower dielectric constant to be compatible with the desired signal performance characteristics of the signals transmitted over the signal contacts in the housing.

20 Claims, 3 Drawing Sheets

3D PRINTED ELECTRICAL CONNECTOR WITH TUNABLE DIELECTRIC CONSTANT

FIELD OF THE INVENTION

The present invention relates to a 3D printed electrical connector with tunable dielectric constant. In particular, the invention is directed to an electrical connector with high speed signal contacts which has ultraviolet curable resins that are compatible with high speed electrical signaling.

BACKGROUND OF THE INVENTION

With the recent rapid increase in the amount of information communicated, reductions in size and weight and increases in the speed of electronic devices is often required. For such devices, electrical insulating materials with targeted dielectric constants that can accommodate high speed connector designs are beneficial.

However, various difficulties are encountered in achieving targeted dielectric constants by using only resins. These difficulties are also experienced when using 3D printing or additive manufacturing to produce the housings and components of the electrical connector.

Three-dimensional printing or additive manufacturing has become increasingly popular over the past several decades as a means of manufacturing prototypes as well as end user production products. As the range of 3D products has become diverse, interest in developing printable materials that exhibit tunable properties such as conductivity or elasticity has increased. Nonetheless, the technology is still constrained as the product of a 3D printer is restricted by one or more of the materials that are combined into a given product.

Three-dimensional printing is a technique that cures material only where needed. Consequently, there is significantly less wasted material than in traditional manufacturing techniques. There is no need to mill or cut pieces in order to build a design shape as in traditional manufacturing techniques.

Two techniques used in three-dimensional printing are stereolithography (SLA) and digital light projection (DLP). Both of these techniques are based upon photopolymerizations. The strategy of these two methods is based upon light irradiation through a reservoir filled with photocurable materials.

SLA printing works by exposing a photosensitive liquid polymer resin to a light source. Typically, an ultraviolet (UV) laser is used. The light source rasters across the surface of the sample in a point by point or line by line fashion and introduces enough energy into the resin to induce photopolymerization resulting in the cross linking of the resin polymer to form a cohesive solid structure. Some SLA printers employ a top down approach in which the build plate is above the vat of resin and increases in height after each layer is cured. Other SLA printers employ a bottom up approach in which the build plate is in the resin and moves down after each layer is cured to expose the next layer of resin. This process results in smooth surfaces with highly detailed features.

DLP printers offer reduced printing times while maintaining high fabrication accuracy. In DLP printing, the cross-sectional area of each layer of the product is printed at once by projecting UV light onto a micromirror array that adjusts to form the pattern of the printed cross section. The DLP technology features the light source illuminating each layer all at once as opposed to SLA with point by point exposure.

The article "3D Printing a Mechanically-Tunable Acrylate Resin on a Commercial DLP-SLA Printer" by Borello et. al., describes how few material options exist for additive systems that employ vat photopolymerizations such as SLA and DLP 3D printers. In the article, the authors describe an acrylate photopolymer resin of facile and mechanically tunable formulations that is suitable for use with SLA and DLP 3D printing systems. The acrylate based resin consists of only a single monomer and crosslinker that is mechanically tunable.

The article "Photopolymerization in 3D Printing" by Bagheri et. al., describes how the field of 3D printing has opened up new implementation in rapid prototyping, tooling, dentistry, microfluidics, biomedical devices, drug delivery and other areas. The authors describe how 3D photopolymerizations is based on using monomers/oligomers in a liquid state that can be cured upon exposure to light of a specific wavelength. The authors conclude that developed photocurable formulations have shown great promise, there still needs to be work in tuning the properties of such materials.

Current photocurable polymer compositions do not allow for obtaining products that have satisfactory or desired dielectric constant. Thus, there is a need for a simple photocurable polymer composition, with the addition of additives to the resins, which can be tunable to a desired dielectric constant or dissipation factor.

SUMMARY OF THE INVENTION

An object is to provide a 3D or additive printed electrical connector made from a tunable dielectric constant material which has an ultraviolet curable resin with fillers that is compatible with high speed electrical signaling develop.

An object is to provide a 3D or additive printed electrical connector which has fillers used in the photocurable resin which allows the dielectric constant of the photocurable polymer composition to be adjusted or tuned to have a higher or lower dielectric constant which is compatible with necessary signal performance characteristics, including but not limited to impedance, propagation delay and crosstalk targets transmitted over and near the signal contacts.

An embodiment is directed to an electrical connector assembly which has a housing formed of a first photocurable polymer composition. Signal contacts are positioned in the housing for transmitting signals at a determined signal speed. A dielectric constant of the photocurable polymer composition is tuned to have a higher or lower dielectric constant to be compatible with the desired signal performance characteristics of the signals transmitted over the signal contacts in the housing.

An embodiment is directed to an electrical connector assembly having an outer housing, an inner housing and signal contact. The signal contacts transmit signals at a determined signal speed. The outer housing is formed of a first photocurable polymer composition. The outer housing has an inner housing receiving cavity. The outer housing is in proximal contact with the signal contacts, The inner housing is positioned in the inner housing receiving cavity of the outer housing. The inner housing is formed of a second photocurable polymer composition. The inner housing is in intimate and proximate contact with the signal contacts. A first dielectric constant of the first photocurable polymer composition of the outer housing and a second dielectric constant of the second photocurable polymer composition of the inner housing are tuned to be compatible with the desired signal performance characteristics of the electrical connector.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
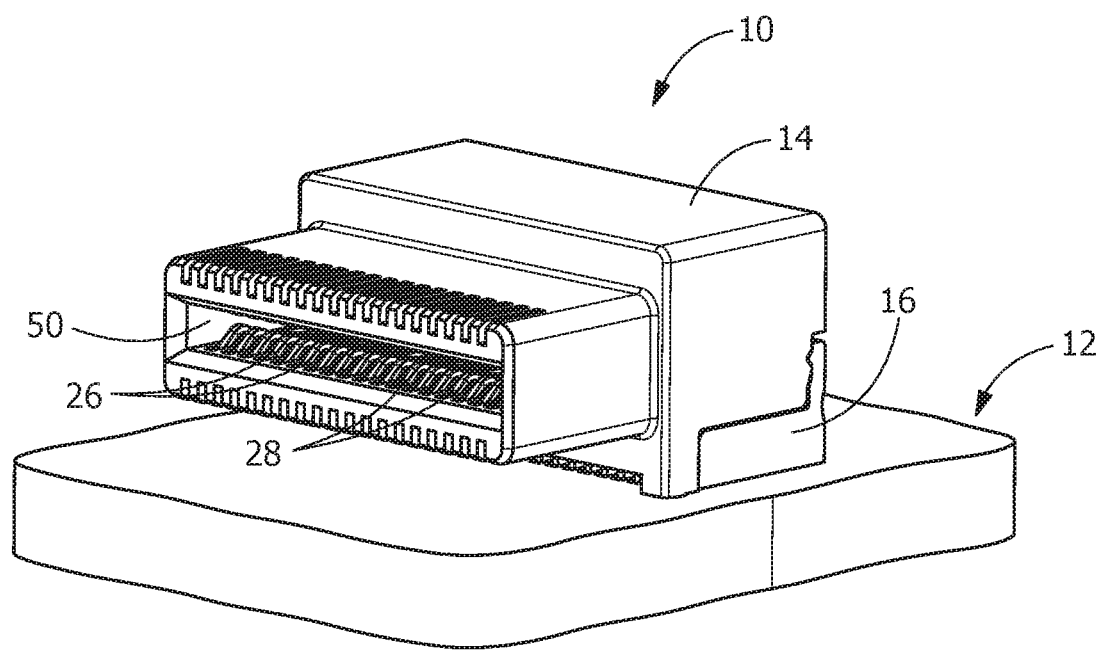
FIG. 1 is a perspective view of an illustrative electrical connector with a housing which is made from material which can be tuned to a desired dielectric constant.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
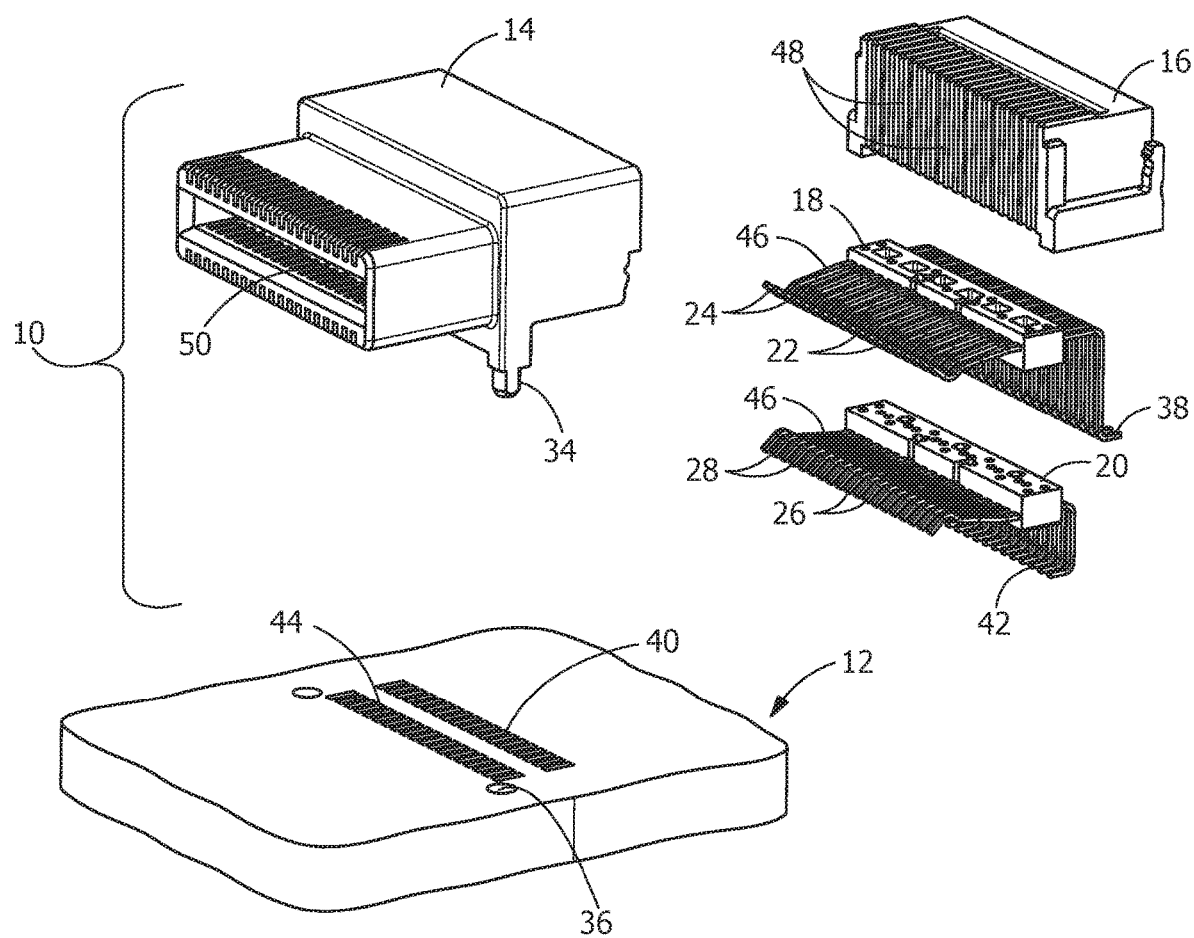
FIG. 2 is a top perspective exploded view of FIG. 1.
Figure 3:
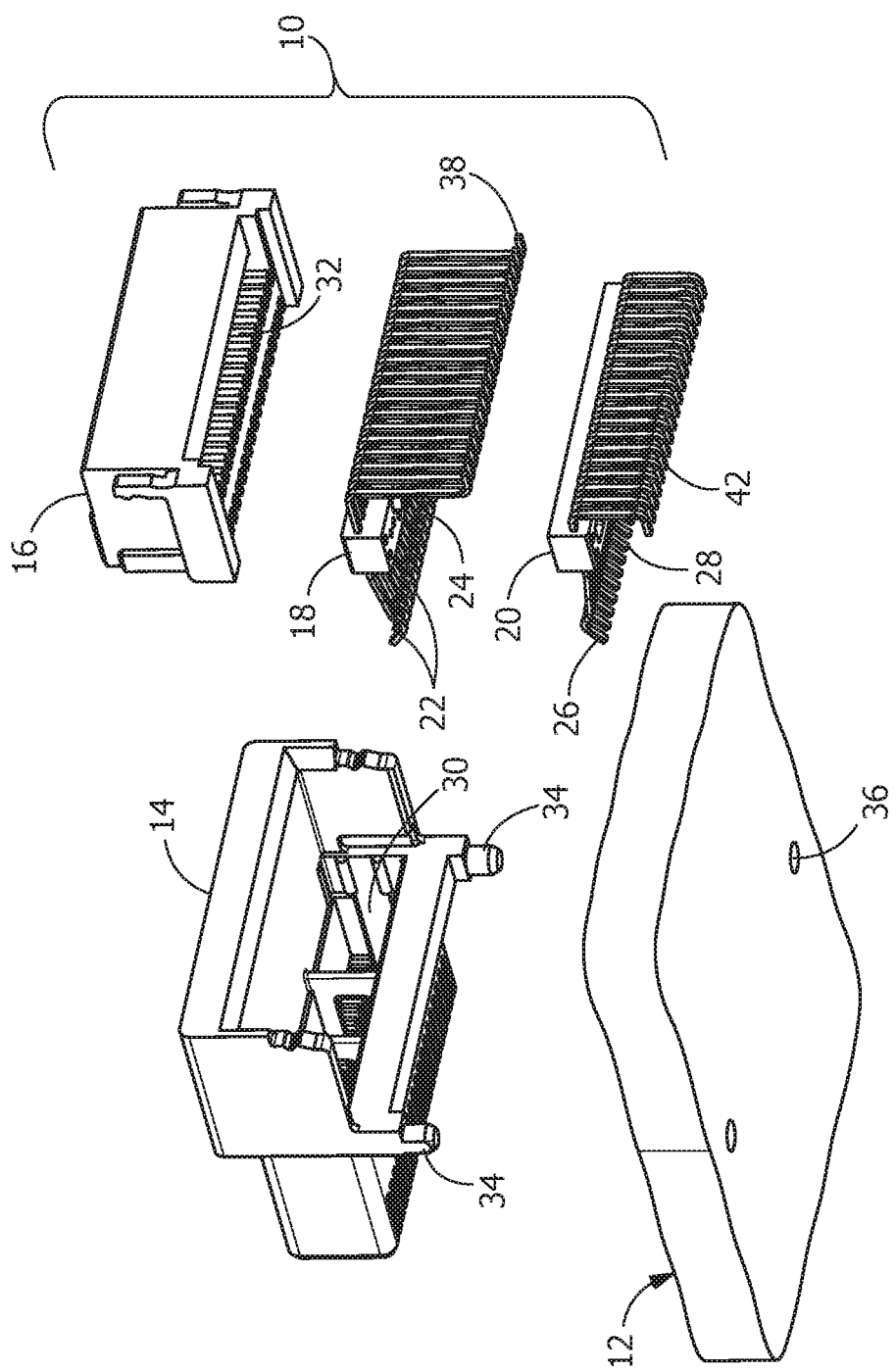
FIG. 3 is a bottom perspective exploded view of FIG. 1.

As shown in FIG. 1, an illustrative embodiment of an electrical connector 10 is mounted on a substrate 12, such as a printed circuit board. As shown in FIGS. 2 and 3, the illustrative electrical connector 10 includes an outer housing 14, an inner housing 16, a first lead frame 18 and a second lead frame 20. First signal contacts 22 and first ground contacts 24 are positioned in the first lead frame 10. Second signal contacts 26 and second ground contacts 28 are positioned in the second lead frame 20. Although connector 10 is shown and described, other types of electrical connectors with other types of components can be used without departing from the scope of the invention.

The outer housing 14 may be formed using a 3D or additive manufacturing process, such as, but not limited to stereolithography or digital light projection. The outer housing 14 is formed using a photocurable polymer composition which is tunable to a desired dielectric constant. In the illustrative embodiment, the photocurable polymer composition includes a photocurable resin with fillers dispersed in the photocurable resin. The amount and type of fillers used in the photocurable resin allows the dielectric constant of the photocurable polymer composition to be adjusted or tuned to have a higher or lower dielectric constant which is compatible with the signal speed transmitted over the signal contacts 22, 26. The photocurable polymer composition is described in U.S. patent application Ser. No. 16/944,434 entitled Composition For Use In 3D Printing, which is hereby incorporated by reference in its entirety.

To increase the propagation velocity of the signal contacts 22, 26 and enable high-speed operation, for example 10 Gbps or higher, the photocurable resin and the fillers are configured to provide a photocurable polymer composition which is adjusted or tuned to have a higher or lower dielectric constant which is compatible with the necessary signal performance characteristics, including but not limited to impedance, propagation delay and crosstalk targets transmitted over and near the signal contacts 22, 26. In addition, the photocurable resin and the fillers are configured to provide a photocurable polymer composition with appropriate physical properties, such as high heat resistance and high mechanical strength By altering the composition of the photocurable polymer composition the dielectric characteristics of the outer housing 14 can be tuned to minimize propagation delay of the signals as the signals are transmitted over the signal contacts in the housing, thereby minimizing interference to the signal transmitted over the signal contacts 22, 26, based on the signal speed, which in turn optimizes the signal transmission.

Any photocurable resin that can be used in 3D printers may be used, including but not limited to UV curable olefins, UV curable epoxies and UV curable acrylates. In one illustrative embodiment, the photocurable resin is based upon an acrylate. Alternatively, the photocurable resin can be a modified acrylate in which the backbone of the acrylate is modified to make it UV curable. Examples of such modified acrylates include, but are not limited to, epoxies or cyanate esters. Examples of suitable photocurable resins that are commercially available include HT300 available from 3D Systems; CE 221 available from Carbon 3D; and Tough Black resin available from 3D Systems.

As previously stated, to achieve the desired dielectric constant, fillers are added to the photocurable resin. The desired dielectric constant is determined by the signal speed across the signal contacts 22, 26 of the connector 10. The fillers are selected based upon the desired dielectric, the ability of the filler to disperse in the base resin, as well as printability of the composition. Fillers that agglomerate in the photocurable resin are not desired or preferred.

In various illustrative embodiment, different types of fillers may be used, such as, organic fillers and/or inorganic fillers. Examples of organic fillers include polyethylene (PE), polytetrafluoroethylene (PTFE), and polybutylene terephthalate (PBT). Examples of inorganic fillers include mica, magnesium oxide (MgO) and titanium dioxide ($TiO_2$). Preferred filler size and morphology will vary based upon the base resin and the filler combination.

The range of the filler in the photocurable polymer composition is about 15 weight percent to about 40 weight percent. A single filler can be used in the photocurable polymer composition. However, it has however been found that a mixture of fillers enhances the electrical properties of the photocurable polymer composition while optimizing printability. An illustrative example of a mixture of fillers that can be used is a mixture (weight percent) of 28-32% mica and 8-12% magnesium oxide. To enhance printability, 10-15% titanium dioxide, 0.05-1% mica and 0.050-1% magnesium oxide can be used.

The inner housing 16 may be made using a 3D or additive manufacturing process, such as, but not limited to stereolithography or digital light projection. The inner housing 16 is positioned in an inner housing receiving cavity 30 of the outer housing 14 and retained therein. The inner housing 16 is formed using a photocurable polymer composition which is tunable to a desired dielectric constant, similar to that described above. In the illustrative embodiment, the photocurable polymer composition includes a photocurable resin with fillers dispersed in the photocurable resin. The amount and type of fillers used in the photocurable resin allows the dielectric constant of the photocurable polymer composition to be adjusted or tuned to have a higher or lower dielectric constant which is compatible with the signal speed transmitted over the signal contacts 22, 26.

The inner housing 16 may be formed from the same photocurable polymer composition as the outer housing 14 or from a different photocurable polymer composition than the outer housing 14. As the inner housing 16 may be provided in both proximal and intimate contact with the signal contact 22, 26 and the ground contacts 24, 28, it may be beneficial to form the inner housing 16 from a photocurable polymer composition which has different dielectric characteristics than the outer housing 14, which is only in proximal contact with the signal contact 22, 26 and the ground contacts 24, 28.

By tuning or altering the composition of the photocurable polymer composition, including the types and percentages by weight of the photocurable resin and the fillers between the outer housing 14 and the inner housing 16, the interference to the signal transmitted over the signal contacts 22, 26 is minimized as the signal is transmitted through the inner housing 16 and the outer housing 14, thereby optimizing the signal transmission.

In various illustrative embodiments the first lead frame 18 may be formed over the first signal contacts 22 and the first ground contacts 24 using a 3D or additive manufacturing process, such as, but not limited to stereolithography or digital light projection. The first lead frame 18 is formed using a photocurable polymer composition which is tunable to a desired dielectric constant, similar to that described above. In the illustrative embodiment, the photocurable polymer composition includes a photocurable resin with fillers dispersed in the photocurable resin. The amount and type of fillers used in the photocurable resin allows the dielectric constant of the photocurable polymer composition to be adjusted or tuned to have a higher or lower dielectric constant which is compatible with necessary signal performance characteristics, including but not limited to impedance, propagation delay and crosstalk targets transmitted over and near the signal contacts 22, 26.

The first lead frame 18 and/or the second lead frame 20 are positioned in a contact receiving cavity 32 of the inner housing 16 and retained therein. The first lead frame 18 and/or the second lead frame 20 may be formed from the same photocurable polymer composition as the outer housing 14 or the inner housing 16, or from a different photocurable polymer composition than the outer housing 14 or the inner housing 16. As the first lead frame 18 and the second lead frame 20 are provided in intimate contact with the signal contact 22, 26 and the ground contacts 24, 28, it may be beneficial to form the first lead frame 18 and the second lead frame 20 from a photocurable polymer composition which has different dielectric characteristics than the outer housing 14 and/or the inner housing 16.

When assembled, mating projections 34 of the outer housing 14 are positioned in mounting openings 36 of the substrate 12 and are secured therein using known methods. In this position, mounting ends 38 of contact 22, 24 are mounted onto contact pads 40 of the substrate 12 and retained thereon by soldering or the like. In addition, mounting ends 42 of contact 26, 28 are mounted onto contact pads 44 of the substrate 12 and retained thereon by soldering or the like. Mating ends 46 of contacts 22, 24, 26, 28 extend through mating end receiving cavities 48 of the inner housing 16 to a mating connector receiving cavity 50 of the outer housing 14.

By altering the composition of the photocurable polymer composition, including the types and percentages by weight of the photocurable resin and the fillers between the first lead frame 18, the second lead frame 20, the outer housing 14 and the inner housing 16, the interference to the signal transmitted over the signal contacts 22, 26 is minimized as the signal is transmitted through the inner housing 16 and the outer housing 14, thereby optimizing the signal transmission.

One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector assembly comprising:
a housing formed of a first photocurable polymer composition;
signal contacts for transmitting signals at a determined signal speed;
wherein a dielectric constant of the photocurable polymer composition is tuned to have a higher or lower dielectric constant to be compatible with the desired signal performance characteristics of the signals transmitted over the signal contacts in the housing.

2. The electrical connector assembly as recited in claim 1, wherein the first photocurable polymer composition includes a photocurable resin with fillers dispersed in the photocurable resin.

3. The electrical connector assembly as recited in claim 2, wherein the housing is formed by a 3D manufacturing process.

4. The electrical connector assembly as recited in claim 1, wherein the housing is an outer housing which is in proximal contact with the signal contacts.

5. The electrical connector assembly as recited in claim 4, wherein an inner housing is positioned in an inner housing receiving cavity of the outer housing, the inner housing formed of a second photocurable polymer composition, the second housing is in intimate and proximate contact with the signal contacts.

6. The electrical connector assembly as recited in claim 5, wherein the second photocurable polymer composition includes a photocurable resin with fillers dispersed in the photocurable resin.

7. The electrical connector assembly as recited in claim 6, wherein the inner housing is formed by a 3D manufacturing process.

8. The electrical connector assembly as recited in claim 7, wherein the second photocurable polymer composition has the same formulation as the first photocurable polymer composition.

9. The electrical connector assembly as recited in claim 7, wherein the second photocurable polymer composition has a different formulation than the first photocurable polymer composition.

10. The electrical connector assembly as recited in claim 7, wherein at least one lead frame is positioned in a contact receiving cavity of the inner housing, the at least one lead frame formed of a third photocurable polymer composition, the at least one lead frame is in intimate contact with the signal contacts.

11. The electrical connector assembly as recited in claim 10, wherein the third photocurable polymer composition includes a photocurable resin with fillers dispersed in the photocurable resin.

12. The electrical connector assembly as recited in claim 11, wherein the at least one lead frame is formed by a 3D manufacturing process.

13. The electrical connector assembly as recited in claim 12, wherein the third photocurable polymer composition has the same formulation as the first photocurable polymer composition.

14. The electrical connector assembly as recited in claim 12, wherein the third photocurable polymer composition has the same formulation as the second photocurable polymer composition.

15. The electrical connector assembly as recited in claim 12, wherein the third photocurable polymer composition has a different formulation than the first photocurable polymer composition and the second photocurable polymer composition.

16. An electrical connector assembly comprising:
signal contacts for transmitting signals at a determined signal speed;
an outer housing formed of a first photocurable polymer composition, the outer housing an inner housing receiving cavity, the outer housing being in proximal contact with the signal contacts;
an inner housing positioned in the inner housing receiving cavity of the outer housing, the inner housing formed of a second photocurable polymer composition, the inner housing being in intimate and proximate contact with the signal contacts;
wherein a first dielectric constant of the first photocurable polymer composition of the outer housing and a second dielectric constant of the second photocurable polymer composition of the inner housing are tuned to be compatible with the desired signal performance characteristics of the electrical connector.

17. The electrical connector assembly as recited in claim 16, wherein the first photocurable polymer composition includes a first photocurable resin with fillers dispersed in the first photocurable resin and the second photocurable polymer composition includes a second photocurable resin with fillers dispersed in the second photocurable resin.

18. The electrical connector assembly as recited in claim 17, wherein the first photocurable resin and the second photocurable resin are the same.

19. The electrical connector assembly as recited in claim 17, wherein at least one lead frame is positioned in a contact receiving cavity of the inner housing, the at least one lead frame formed of a third photocurable polymer composition, the at least one lead frame is in intimate contact with the signal contacts.

20. The electrical connector assembly as recited in claim 16, wherein the outer housing and the inner housing are formed by a 3D manufacturing process.

* * * * *